United States Patent [19]

Etzold

[11] 4,058,201

[45] Nov. 15, 1977

[54] METHOD AND APPARATUS FOR ORIENTING WOOD STRANDS INTO PARALLELISM

[75] Inventor: Roland Etzold, Mountain View, Calif.

[73] Assignee: Elmendorf Research, Inc., Palo Alto, Calif.

[21] Appl. No.: 535,079

[22] Filed: Dec. 20, 1974

[51] Int. Cl.$^2$ ............................................. B65G 47/34
[52] U.S. Cl. .................................. 198/382; 425/83; 425/110
[58] Field of Search ....................... 198/254, 266–269, 198/281–284, 287, 382, 383; 425/81, 83, 110; 29/211 C, 211 L, 419 R

[56] References Cited

U.S. PATENT DOCUMENTS

| | | | |
|---|---|---|---|
| 2,186,652 | 1/1940 | Orth et al. | 198/269 X |
| 3,068,989 | 12/1962 | Packman et al. | 198/268 X |
| 3,115,431 | 12/1963 | Stokes et al. | 425/110 X |
| 3,202,743 | 8/1965 | Elmendorf | 425/83 X |
| 3,268,057 | 8/1966 | Ross et al. | 198/254 |
| 3,367,475 | 2/1968 | Predmore et al. | 198/266 X |
| 3,389,777 | 6/1968 | Rysti | 198/269 X |
| 3,478,861 | 11/1969 | Elmendorf | 198/287 |
| 3,721,329 | 3/1973 | Turner et al. | 198/287 X |
| 3,807,931 | 4/1974 | Wood et al. | 198/287 X |

FOREIGN PATENT DOCUMENTS 106,876   6/1965   Norway ........................... 198/268

Primary Examiner—Evon C. Blunk
Assistant Examiner—Richard K. Thomson
Attorney, Agent, or Firm—Townsend and Townsend

[57] ABSTRACT

A method and apparatus is described for use in producing a wood product comprising at least one layer of binder-coated wood strands oriented into parallelism by causing the strands to fall through elongated, parallel spaces defined by a plurality of generally rigid plates or flexible belt stretches located in vertical planes and parallel to each other above a moving support. The distance from each plate or belt stretch to the next adjacent plate or belt stretch is less than the average length of the strands. In one embodiment, adjacent, generally rigid plates reciprocate in opposite directions relative to each other. In another embodiment, adjacent belt stretches of an endless, flexible belt move in opposite directions with respect to each other. The upper edges of the plates and belt stretches have a number of spaced projections which operate to turn the strands which span two or more plates or belt stretches until the strands are aligned with the spaces therebetween and fall into such spaces toward and onto the moving support.

18 Claims, 7 Drawing Figures

METHOD AND APPARATUS FOR ORIENTING WOOD STRANDS INTO PARALLELISM

BACKGROUND OF THE INVENTION

The present invention describes a method and apparatus for use in producing a structural wood particle board. The board has one or more layers of wood elements or strands oriented into parallelism with each other. A product of this type and the merits of orienting the wood elements thereof are described in U.S. Pat. No. 3,164,511.

The method and apparatus described herein are improvements over U.S. Pat. No. 3,478,861, which teaches stationary, parallel plates arranged in vertical planes and spaced from each other at distances less than the average length of the strands above a support. The plates have movable elements adjacent to their upper edges, such as segments of a cord in tension or metal caps, which move along these upper edges parallel to each other but in opposite directions from elements immediately adjacent thereto. The vertical plates, being stationary, require strands with closely controlled geometry. A single strand having a width greater than the gap between two plates, a partly broken strand, or too many strands at a given time and location may cause a gap to fill up, thereby interrupting the process of felting or depositing the strands on a moving support therebelow. This limitation requires careful screening of the strands and formation of an oriented mat of strands at a relatively slow rate. Furthermore, if orientation of the strands transversely to the movement of the support is desired, only a relatively slow speed of the movable support is possible, and the lower edges of the plates must be at a substantial distance from the felted mat, which allows some of the strands to disorient again.

Other disclosures relating to the problem of orienting wood strands include U.S. Pat. Nos. 3,114,431 and 3,721,329. Both of these patents, however, fail to disclose or suggest either an apparatus or a method which orients the strands in the same way or as efficiently as is capable with the practice of the present invention hereinafter described.

The apparatus for producing an oriented strand mat must be capable of handling the large volume of strands per unit of time which is the standard in the present-day particle board industry because of the high investment cost of such a plant. For instance, a typical 500 tons per day plant requires mat formation at the rate of almost 800 lbs. of strands per minute in a 22-hour day operation. Generally, in many plants, there are four forming heads; therefore, four orienting mechanisms would be required. Each orienting mechanism must therefore orient about 200 lbs. of strands each minute. It must do so without interruption or occasional strand congestion. Orienting means, such as vertical plates or belts, should be relatively thin. If thick members would be used when orienting parallel to support movement, the resultant mat will show ridges, but more importantly, the volume of strands, hereafter referred to as through-put, which can be oriented, will decrease as the ratio of gap space to plate thickness decreases. This is particularly true if the distance from plate to plate must be small due to shorter strand length. Stationary plates with moving metal caps on their upper edges, as in U.S. Pat. No. 3,478,861, provide an example where the thickness of the plates is increased at their upper edge by a wider moving cap or channel. This additional width is being taken away from the gap between plates and thereby decreases the through-put of the apparatus.

SUMMARY OF THE INVENTION

The apparatus and method of this invention operates to orient wood strands both parallel and transverse to the direction of relative support movement. The invention also provides an improvement in the degree of strand orientation, particularly transversely to the movement of the support, and allows a substantial volume of wood strands to be oriented into parallelism on a continuous basis without clogging the gaps between adjacent strand guide members when occasional strands are bent or partly broken.

While the present invention is directed toward orientation of strands, that is, elements many times longer than wide, it is also usable for the orientation of wafers. These are wood elements used today in commercially manufactured wafer boards such as Aspenite. The length of the wafer, which is the dimension in the fiber direction, should be somewhat greater than its width; however, a very low ratio of length to width such as two will result in satisfactory orientation. While the average length of strands must be greater than the distance between adjacent belts, the width of individual strands is less than this distance. The width of many wafers, however, will be greater than the distance between adjacent guide members and therefore will clog the spaces between stationary fins of orienting devices such as described in U.S. Pat. No. 3,478,861. The present invention makes the orientation of wafers possible without clogging of those spaces due to the movements of the guide members and will at the same time permit a high through-put. The distance from the lower edge of the guide members to the moving support or the top of the felted mat must be greater when orienting wafers than when orienting strands.

The apparatus comprises a number of longitudinally straight strand guide members, each acting as a boundary between adjacent elongated parallel spaces. In one embodiment the guide members are in the form of spaced, relatively rigid plates of metal, plastic or the like held in tension and, in another embodiment, are in the form of parallel stretches of an endless, flexible belt. The guide members are generally at equal distances from each other and are positioned above a moving support. The opposed, flat faces of the guide members are in vertical planes, the lengths of the guide members extending in the direction of movement of the support when orientation of strands parallel to support movement is desired, and extending transversely to the direction of support movement when orientation transverse to support movement is desired.

The upper edges of the guide members have protruding elements or projections in the same plane as respective guide members. Adjacent guide members move parallel to each other, in the direction of their longitudinal axis, but in opposite directions. This movement is preferably a straight-line, back-and-forth motion, since this will allow a uniform distance between the lower edges of the guide members and the support or felted mat at all times. Strands deposited from above the guide members will fall onto the same and between the guide members. Those strands spanning the upper marginal edges of two or more moving guide members are turned in an arc in a generally horizontal plane and fall also between the guide members onto the moving support. This arcuate movement is aided by the movement of the protruding elements on the upper edges of the guide members.

In the present invention, the strand guide members are relatively thin and the protruding elements, since they are integral with the guide members, add little or no thickness thereto. This feature results in a very high ratio of gap space to strand guide member thickness and thereby in a high through-put. It also produces a felted mat without longitudinal ridges when orienting strands parallel to the direction of travel of the moving support.

The primary object of this invention is to provide an improved apparatus and a method for orienting wood strands into parallelism with each other by parallel strand guide members wherein the guide members operate in a manner to assure a relatively high through-put to a moving support therebelow without any clogging of the spaces between the strand guide members.

Another object of this invention is to provide an apparatus and a method of the type described wherein adjacent strand guide members are relatively thin and move in opposite directions so that the strands spanning the same are pivoted in a horizontal plane until the strands become aligned with and fall into the spaces between the strand guide members.

Another object is to provide a method and apparatus which will permit orientation of wafers of the type described which are considerably wider than strands and frequently as wide as or wider than the distance between adjacent guide members.

Other objects of this invention will become apparent as the following specification progresses, reference being had to the accompanying drawing for an illustration of the invention.

IN THE DRAWINGS

Figure 1:
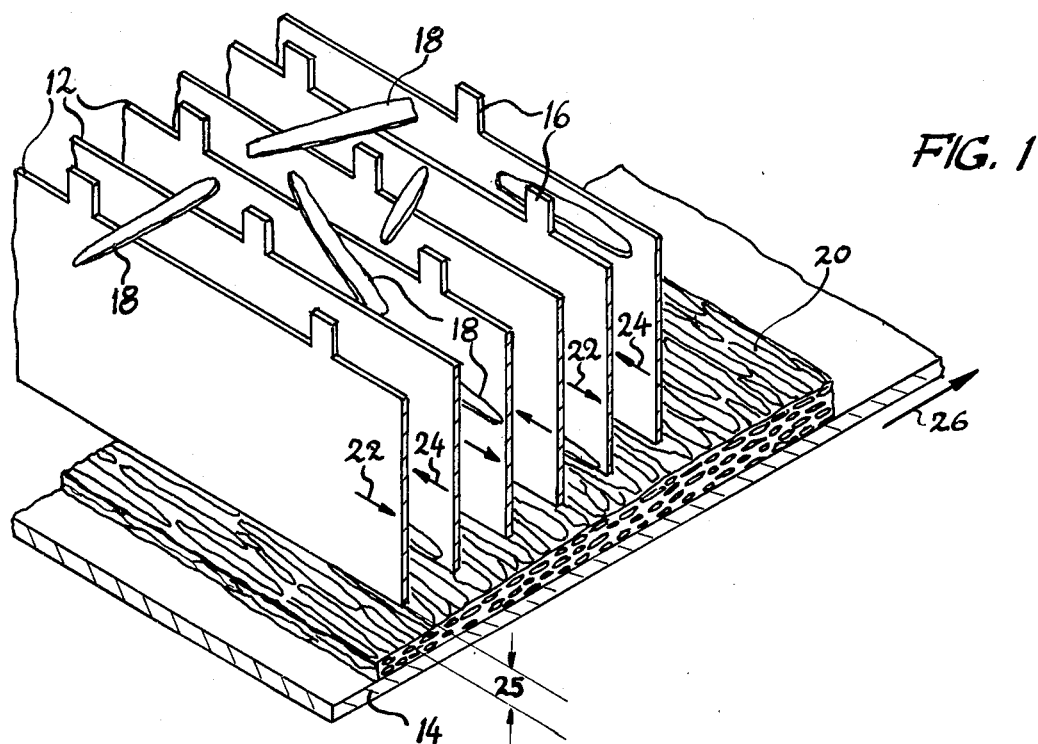
FIG. 1 is a fragmentary, perspective view of one embodiment of the apparatus of this invention, showing a plurality of rigid, parallel strand guide members above a support for receiving a mat of binder-coated wood strands oriented into parallelism by virtue of passing between the members.

The first embodiment of the apparatus for orienting wood strands in accordance with the present invention is shown in FIGS. 1, 4, 5 and 5a. The apparatus includes a plurality of generally rigid, thin, parallel plates or strips 12 which are arranged in respective vertical planes and are disposed above a moving support 14, such as a caul plate, each plate 12 having a plurality of upwardly extending projections 16 at the upper margin thereof, the projections being integral or otherwise connected with the corresponding plate 12. The lower margins of plates 12 are spaced above support 14, and the plates are adapted to orient a plurality of wood strands 18 so that the wood strands fall through the spaces between adjacent plates 12 and gravitate onto support 14 to form a mat 20 of the wood strands.

As the strands 18 fall through the spaces, plates 12 reciprocate along respective horizontal paths relative to each other and support 14 moves in a rectilinear path beneath the plates. Each plate 12 moves in one direction while the next adjacent plate moves in the opposite direction. This aspect is denoted by arrows 22 and 24, respectively (FIG. 1). Support 14 is illustrated in FIG. 1 as being movable in the direction of arrow 26. Therefore, the lower edges of the plates 12 must be some distance away from the felted mat 20, which is indicated by the numeral 25. This movement is transverse to the longitudinal axes of plates 12. This will orient the wood strands transversely to the direction of movement of support 14. Support 14 can also be made to move in a direction parallel with the longitudinal axes of plates 12, as shown in FIGS. 4 and 5, so that different mats 20 can be formed one on top of each other with each mat having strands oriented substantially perpendicularly to the strands of the next adjacent mat 20.

The means for mounting the plates 12 comprise two frames. Adjacent plates are held in tension in different frames in such a manner that all plates are in the same plane. Either a small inner frame moves within a large outer frame, whereby the plates mounted to the outer frame move freely through slots in the end members of the inner frame, or both frames may be of relatively equal size and move partly within each other without interfering with each other as indicated in FIGS. 4, 5 and 5a. The end members 28 and 30 are part of one frame and the end members 32 and 34 are part of the other frame. The side members of the frames connecting the respective end members are not shown in the drawings. The end members 30 and 32 have slots, permitting the plates 12 fastened to the end members 34 and 28 respectively to pass freely. The plates 12 may be of considerable length, depending on the width of the mat to be felted, when orienting transversely to the movement of the support. For instance, in order to form a 100-inch wide mat, the plates will be about 9 feet long. Substantial length of the plates may also be necessary when orienting parallel to support movement in order to obtain adequate through-put. Therefore, lightweight contraction of the orienting apparatus is very important. Each plate 12 is pulled in tension by a means 36 indicated on end members 28 and 34. The tensioning should be adequate to keep the plates 12 in a relatively straight position when operating the apparatus. The required tensioning depends on the type of material and construction of the plates 12. It is desirable that the plates 12 require only light tensioning which will permit the use of lighter reciprocating frames.

Both frames are mounted in the same plane and are moved back and forth in straight paths by a moving means 44 (FIG. 5a). In FIG. 5, the frames are shown in one end position, and in FIG. 5a, they are shown in the other end position. Arrow 38 shows the distance moved from one end position to the other end position of each frame and thereby the parallel movement of adjacent plates in opposite directions during half a cycle. The sum of both frame movements, arrow 38 × 2, is considered the total throw.

Figure 4:
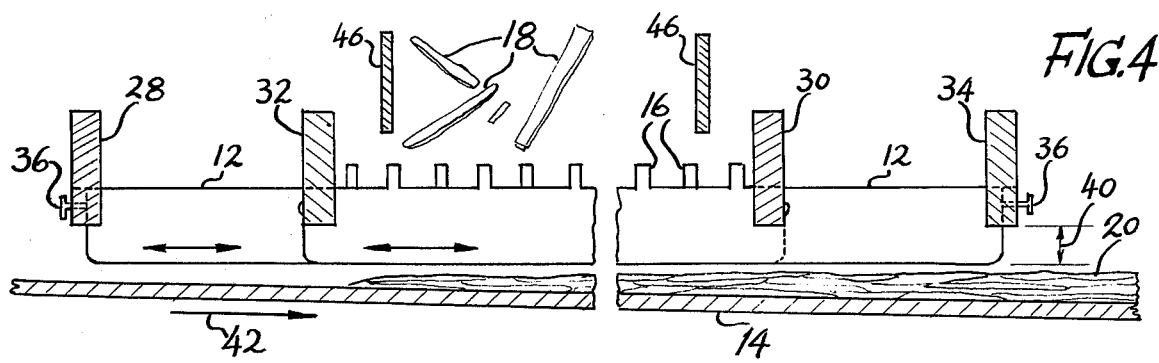
FIG. 4 is a schematic, fragmentary, cross-sectional view of the apparatus of FIG. 1, showing the orienting of strands parallel to support movement.
Figure 5:
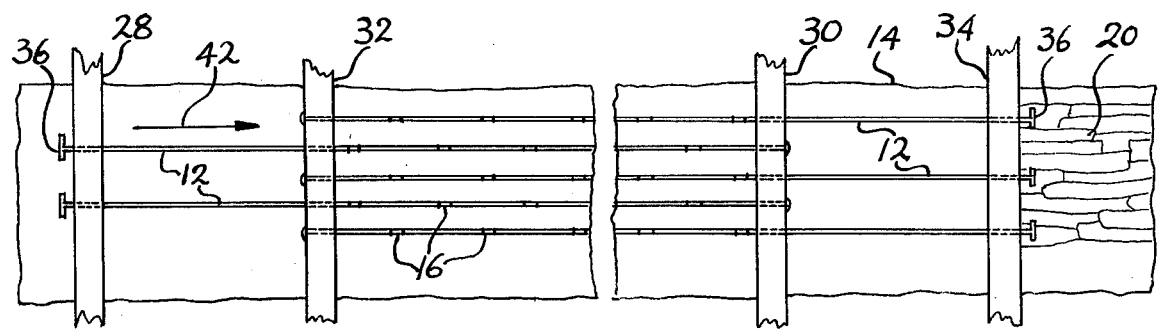
FIG. 5 is a schematic, fragmentary top plan view of the apparatus of FIG. 4.
Figure 5A:
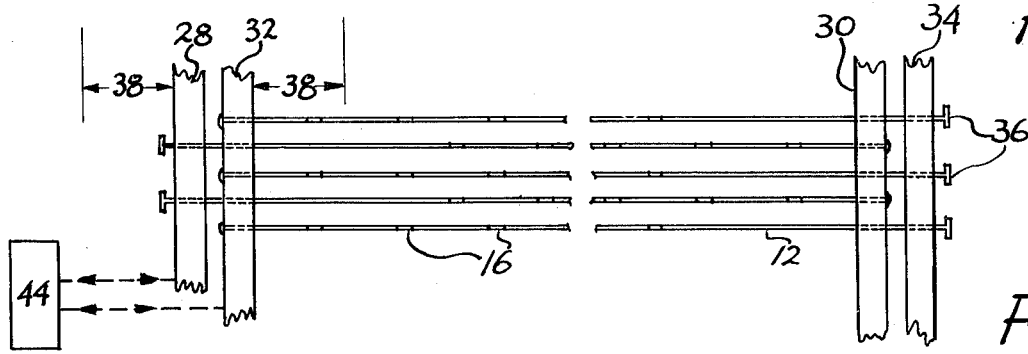
FIG. 5a is a schematic, fragmentary top plan view of the apparatus of FIG. 4, showing adjacent strand guide members and portions of their frame in a different position than in FIG. 5.

It is preferred that only the upper ends of plates 12 are connected to the end members of respective frames, as shown in FIG. 4. Preferably, the plates are formed of thin sheet metal, but they can be of other material, such as a flexible belt material. When flexible material is used, the plates must be secured along substantially their entire end margins to the end members of respective frames. If the plates are sheet metal, for instance, and are only connected at their upper ends to the frames, this leaves the lower ends of the plates free and permits them to extend beyond the lowest part of the respective frame. This extension is indicated by arrow 40 (FIG. 4). It will permit a minimum distance between the lower margin of each plate and mat 20 of wood strands when orienting parallel to the direction of movement of support 14. The shorter this distance is, the less opportunity for the wood strands to disorient after leaving the spaces between respective plates. Mat 20 may even contact or cover the lower marginal edges of plates 12 if plates 12 and support 14 move parallel to each other as is illustrated in FIGS. 4, 5 and 5a, without being disturbed by the moving end members 30 and 34.

FIGS. 4 and 5 show that the support 14 moves in the direction of the longitudinal axis of plates 12 as indicated by arrow 42. This results in parallel orientation of the strands 18 as indicated by a portion of the felted mat 20. A pair of parallel sidewalls 46 (FIG. 4) can be used to guide wood strands 18 onto a specific region above plates 12.

As the plates reciprocate, they orient the wood strands so that the strands are essentially parallel with the plates as the wood strands gravitate toward and onto support 14 to form mat 20. The orienting action, due to reciprocation of the plates, continues until the wood strands have been completely distributed onto the moving plates. When a strand contacts the support or felted mat with one end and a strand guide member with the other end, it is dragged into parallelism by the moving guide member and deposited onto the support.

An advantage of the reciprocating movement of plates 12 is a certain self-cleaning effect due to the abrupt stopping and reversal of the movement of the plates. This movement can also be obtained with endless belts 70 and 100 (FIGS. 2, 2a and 3); however, a relatively small space between mat 20 and the lower margins of the belt when orienting wood strands parallel to the movement of the support is generally not possible due to the requirement of reversing the belt movement by way of pulleys.

Figure 2:
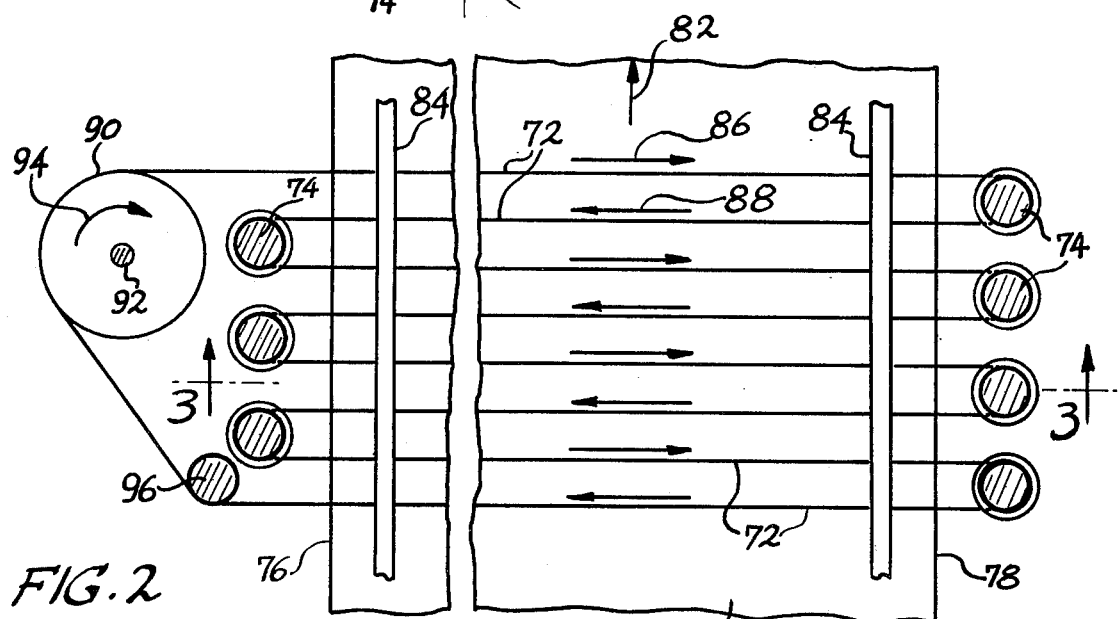
FIG. 2 is a schematic, top plan view of a second embodiment of the apparatus, showing an endless, flexible belt extending in a number of passes over a support to present a plurality of parallel spaces through which binder-coated wood strands can pass for orienting the strands before they fall onto the support.
Figure 3:
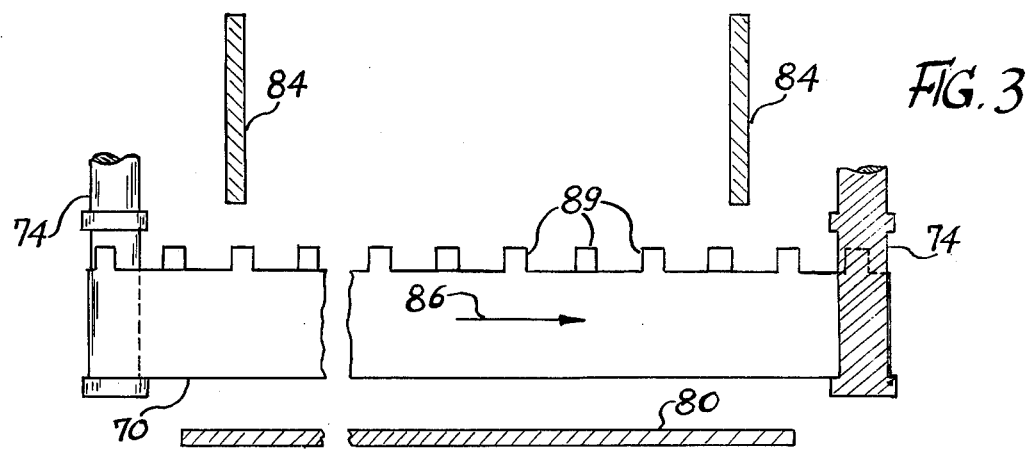
FIG. 3 is a cross-sectional view taken along line 3—3 of FIG. 2.

As shown in FIGS. 2 and 3, belt 70 has a plurality of parallel stretches 72 which are arranged in respective vertical planes by the presence of a plurality of pulleys 74 at opposite side margins 76 and 78 of a support 80 arranged to move in the direction of arrow 82 (FIG. 2). It is also possible to arrange stretches 72 so that they are parallel to the direction of movement of support 80 rather than perpendicular thereto as shown in FIG. 2. This would require mounting pulleys 74 for rotation so that support 80 can pass therebeneath. Stretches 72 are also disposed between a pair of sidewalls 84 which direct wood strands downwardly toward the spaces between belt stretches 72.

By mounting belt 70 on pulleys 74, adjacent stretches 72 are caused to move in opposed directions as denoted by arrows 86 and 88, respectively. Also, belt 70 has a plurality of projections 89 thereon as shown in FIG. 3 and these projections serve the same purpose as projections 16 on plates 12 of FIG. 1. Belt 70 is also wrapped about a drive pulley 90 coupled to drive shaft 92 of a drive motor (not shown). Pulley 90 is rotated in the direction of arrow 94 to cause belt stretches 72 to move in the direction of arrows 86 and 88, respectively. The belt passes around an idler 96 merely to apply tension to the belt and to assure that the belt stretches are generally retained in respective vertical planes at all times.

The embodiment of the invention shown in FIGS. 2 and 3 operates in substantially the same manner as that described above with respect to the embodiments of FIGS. 1, 4, 5 and 5a. To this end, wood strands fall from feed structure (not shown) above belt stretches 72 into the spaces between adjacent stretches 72 and are oriented thereby so that the strands become substantially parallel with stretches 72 as they gravitate onto moving support 80 therebelow. Projections 89 serve to orient the wood strands that span adjacent stretches 72. As the wood strands fall onto support 80, they form a mat (not shown) of the type shown in FIG. 1.

Figure 2A:
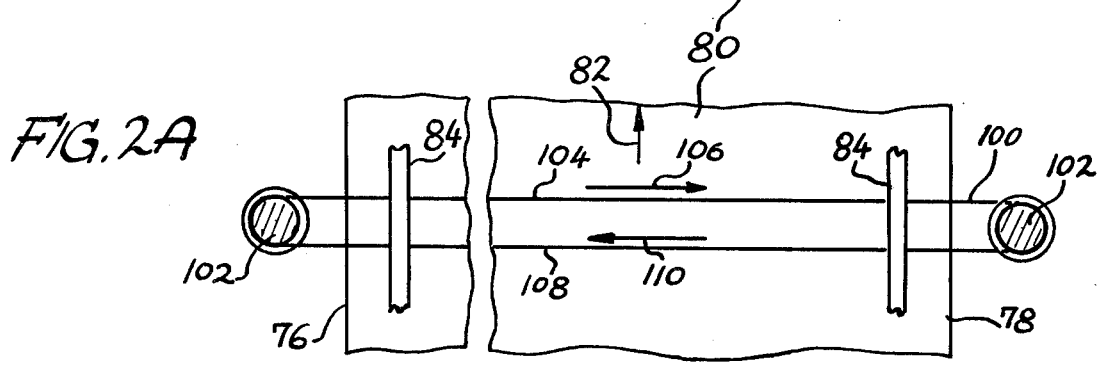
FIG. 2a is a view similar to FIG. 2 but showing another form thereof.

A modification of the belt concept is shown in FIG. 2a wherein, instead of a single belt, a plurality of endless belts 100 are used, only one of such belts being shown in FIG. 2a. Each belt 100 is coupled to a respective pair of pulleys 102 adjacent to respective side margins 76 and 78 of moving support 80 therebelow. Drive means (not shown) is coupled to one of pulleys 102 for rotating the same so that the belt 100 will move so that one of its stretches 104 will move in the direction of arrow 106 and its other stretch 108 will move in the direction of arrow 110 opposite to the direction of arrow 106. Also, belt 100 will be provided with projections for the same purpose of projections 89 (FIG. 3).

The distance between strand guide members, which are defined as plates 12 of FIGS. 1, 4, 5 and 5a, and belt stretches 72 of FIGS. 2 and 3 should be less than the average length of the wood strands. With the continuous belt of FIGS. 2 and 3, this distance may be determined by a practical pulley dimension.

The height of the strand guide members will affect the weight of the total machine. An increase in height will require more tension per guide member and therefore a heavier construction of the moving parts of the apparatus. In the case of endless belts, it will affect the dimension of the pulleys. In the case of individual plates mounted in frames, it will increase the total mass which has to be moved and which movement has to be reciprocal at a substantial amplitude and frequency. Considering these factors and the fact that a strand guide member with a very low height will impair the degree of orientation, the optimum height of the strand guide members should be about equal to the maximum length of the strands, but even strand guide members having a height of about one-half of the average length of the strands will orient strands adequately.

The speed of the movement of the strand guide members will depend on the method used and whether the orientation of the strands is parallel or perpendicular to the direction of the support movement. The amplitude of the reciprocating plates is also a factor and is dependent on the distance between the protruding elements and the length of the strands.

When orienting in the direction of support movement, even a very slow speed of the strand guide member will turn strands spanning two or more strand guide member edges and cause them to fall between adjacent strand guide members, resulting in good orientation. Even at the same slow speed clogging of the gaps due to wide flakes or bent strands will not occur. If, however, a higher through-put is desired, speed of the strand guide member must be increased. A high speed of the support does not adversely affect the orientation. The method using reciprocating plates mounted in frames is particularly attractive for orienting in the direction of support movement, since each lower plate edge may be close or even in contact with the felted mat, whereas, when orienting transversely to support movement, the lower plate edges must not be close to the upper surface of the felted mat, so as not to disturb the felted mat.

When orienting transversely to the support movement, the strand guide member speed is of more importance. Strands which are upended and contact the support or felted mat with one end and a strand guide member with the other end should be dragged into orientation by the moving strand guide member faster than the moving support can drag the strand out of orientation. The degree of orientation diminishes with increased support speed. Therefore, the strand guide member speed should exceed the support speed when orienting transversely. The continuously moving belts can achieve higher average speeds as compared with the reciprocating plates. Therefore, this method lends itself particularly to orienting perpendicular to support movement.

To avoid strands losing their orientation after leaving the spaces between the strand guide members, the distance between the lower edges of the strand guide members and the top of the felted mat should be kept at a minimum; the distance from the lower edges of the guide members to the moving support should, therefore, increase in the direction of support movement at about the same rate as the mat increases in thickness during formation, as shown in FIGS. 1 and 4. This is applicable to orientation both parallel and perpendicular to support movement.

Projections 16 and 89 may have various shapes and heights. Their distance from each other will depend on factors such as the distance from one strand guide member to the next adjacent one, the length of the strands and the total throw of the strand guide members. When strands span more than two edges of strand guide members, the total throw must be more than twice the distance from one protruding element to the next; otherwise strands are not turned adequately and will collect on the upper edges of the strand guide members perpendicular thereto.

An example of the specifications for a preferred orienting apparatus when using strands having an average length of about two inches is as follows:

EXAMPLE

| Strands | 2 Inches Maximum Length |
| --- | --- |
| Distance between strand guide members | ⅜ inch |
| Thickness of the strand guide member | 0.025 inch |
| Height of strand guide member | 2 inches |
| Distance between projections | 2 inches |
| Height of projection | ¾ inch |
| Width of projection | ⅜ inch |
| Total throw | 6 inches |
| Frequency | 300 throws/min. |

The length of the projections above the upper edge of the guide members is of great importance in relationship to the through-put. Short projections will not always turn strands spanning two or more strand guide member edges sufficiently to drop in the spaces therebetween. This is especially the case if large quantities of strands are rained upon the strand guide member edges. For example, extending perpendicular projections (that is, projections with edges having an angle of 90° to the upper edge of the strand guide member) in length from ¼ to ¾ inch increases the through-put markedly, yet a further extension does not seem to be warranted. If several strands span two strand guide members at the same place, longer projections will turn all the strands and not only the lower ones at the same time. Longer projections will also turn some strands in an arc before they come to rest across two or more strand guide members, thereby increasing the ratio of strands which fall directly between adjacent strand guide members. If the projections are even longer, strands may be turned earlier and thereby may turn farther than necessary, which would being them to rest across the strand guide members rather than letting them fall therebetween. Therefore, an increase of the length of the projections beyond a certain maximum does not increase the through-put, and while this optimum length will depend on the strand guide member speed and strand geometry, about one inch will be, in most cases, sufficient.

The projections may have various forms, whereby a sawtooth configuration with flatter than vertical edges such as a 45° diamond-shaped tooth will be more gentle with the strands and result in less breakage. This is important if at least some of the strands are considerably longer than double the distance between adjacent strand guide members. Using a flexible belt in a continuous manner, with long protruding projections being part of or fastened to the upper edge of the belt, will require that those projections travel with the belt around small pulleys. They must be stiff in the direction of their length, yet narrow enough or flexible in the direction of their movement. The tracking of the belts on the small pulleys is made more difficult with long protruding projections on the upper edge. The method of reciprocating plates, which can be rigid, lends itself more readily for the use of long projections and thereby high through-put.

The strand guide members perform best when in vertical position, when orienting parallel as well as perpendicular to the direction of the support. A tilting of the strand guide members away from the vertical so that each strand guide member acts like a slide does not improve, but rather diminishes the degree of orientation.

When speaking of support movement, it is understood that this is a relative motion between the support and the assembly of strand guide members. Therefore, either the assembly of the strand guide members or the support may move.

I claim:

1. A method of orienting wood strands into parallelism on a moving support to form a mat thereon comprising: providing a group of elongated, generally parallel spaces above the support with each pair of adjacent spaces having a movable boundary therebetween and extending to a predetermined depth and with each boundary having a plurality of spaced projections on the upper margin thereof; directing a mass of loose wood strands toward said group of spaces from above the same so that the strands aligned with the longitudinal axes of the spaces will gravitate therethrough and onto said support; moving each pair of adjacent boundaries in opposite directions relative to each other along respective, generally straight paths to cause corresponding projections to engage those strands which span the distance between the boundaries and to turn such strands into alignment with respective spaces, the speed of movement of the boundaries relative to speed of movement of the support being sufficient to cause upended strands having first ends engaging the strand mat therebelow and second ends engaging adjacent boundaries to be turned into substantial alignment with the longitudinal axes of respective spaces before the movement of the support can cause disorientation of the strands.

2. A method as set forth in claim 1, wherein said providing step includes forming an assembly of generally rigid plates, said moving step including reciprocating said plates.

3. A method as set forth in claim 1, wherein said providing step includes presenting a plurality of parallel stretches of an endless, flexible belt, said moving step including at least partially wrapping said belt around a rotating member.

4. A method as set forth in claim 1, wherein said boundaries are moved at a speed greater than the speed of the support and extend transversely to the direction of movement of the support.

5. A method as set forth in claim 1, wherein said moving step includes shifting said boundaries longitudinally of the direction of movement of the support.

6. A method as set forth in claim 1, wherein said providing step includes positioning the lower margins of said boundaries in proximity to and spaced from the support, the distance between said support and the lower margins of said boundaries increasing in the direction of support movement.

7. Apparatus orienting wood strands into parallelism with each other as they fall toward a moving support comprising: a plurality of spaced, parallel, generally rigid plates; means coupled with said plates for mounting the same above the support for movement relative thereto along generally straight paths with each plate being movable in a direction opposite to the direction of movement of each adjacent plate, each plate having an upper margin provided with a plurality of spaced, strand engageable projections thereon; and means coupled with said plates for moving adjacent plates in opposite directions along respective straight paths at a speed relative to the speed of movement of the support sufficient to rotate wood strands which span the upper margins of two or more plates into alignment with the longitudinal axes of the spaces between the plates and sufficient to cause upended strands having first ends engaging the strand mat therebelow and second ends engaging adjacent plates to be turned into substantial alignment with the longitudinal axes of respective spaces before the movement of the support can cause disorientation of the strands.

8. Apparatus as set forth in claim 7, wherein the projections extend more than ¼-inch above the upper margins of the plates, the height of each plate being approximately equal to the maximum length of the strands.

9. Apparatus as set forth in claim 7 wherein said plates are divided into two groups, said mounting means including a frame for each group respectively, and a tensioning device for each plate, said frames being movable relative to each other and in opposite directions in response to the operation of said moving means.

10. Apparatus as set forth in claim 9, wherein each frame has a pair of spaced end members, said plates substantially spanning the distance between and being secured at their ends to corresponding end members of respective frames and held in tension.

11. Apparatus as set forth in claim 7, wherein is included a movable support below said plates, said support being declined relative to the lower margins of the plates in the direction of support movement.

12. Apparatus as set forth in claim 7, whereby the plates and the projections are less than ⅛-inch in thickness.

13. An apparatus as set forth in claim 7, whereby the total throw of adjacent plates is larger than twice the distance between adjacent projections.

14. Apparatus as set forth in claim 7, said projections having triangular sawtooth shapes.

15. Apparatus as set forth in claim 7, the projections extending perpendicular to the upper margins of said plates and having rectangular shapes.

16. Apparatus for orienting wood strands into parallelism with each other as they fall toward a support comprising: flexible belt means defining a plurality of spaced, parallel, generally planar strand guide members; means coupled with said belt means for mounting the same above the support to position the guide members for movement relative to the support along generally straight paths with each guide member being movable in a direction opposite to the direction of movement of each adjacent guide member, each guide member having an upper margin provided with a plurality of spaced, strand engageable projections thereon; and means coupled with said belt means for moving adjacent guide members in opposite directions along respective straight paths at a speed relative to the speed of movement of the support sufficient to rotate wood strands which span the upper margins of two or more guide members into alignment with the longitudinal axes of the spaces between the guide members and sufficient to cause upended strands having first ends engaging the strand mat therebelow and second ends engaging adjacent guide members to be turned into substantial alignment with the longitudinal axes of respective spaces before the movement of the support can cause disorientation of the strands.

17. Apparatus as set forth in claim 16, wherein said belt means comprises a single, endless, flexible belt defining more than two of said guide members.

18. Apparatus as set forth in claim 16, wherein said belt means comprises a plurality of endless, flexible belts, each belt defining a respective pair of said guide members.

* * * * *